(12) United States Patent
Budagavi

(10) Patent No.: US 7,796,823 B1
(45) Date of Patent: Sep. 14, 2010

(54) TEXTURE COMPRESSION

(75) Inventor: Madhukar Budagavi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 973 days.

(21) Appl. No.: 11/532,989

(22) Filed: Sep. 19, 2006

Related U.S. Application Data

(60) Provisional application No. 60/719,656, filed on Sep. 22, 2005, provisional application No. 60/719,653, filed on Sep. 22, 2005, provisional application No. 60/719,655, filed on Sep. 22, 2005.

(51) Int. Cl.
*G06K 9/36* (2006.01)

(52) U.S. Cl. ............ 382/232; 382/233; 382/236; 382/240; 382/234

(58) Field of Classification Search .......... 382/173, 382/298, 240, 162, 236, 234, 232, 233; 375/E7.254, 375/240.01, 420.01; 345/582, 423, 428; 324/309; 348/E13.014; 600/109, 117
See application file for complete search history.

(56) References Cited

U.S. PATENT DOCUMENTS

| | | | | |
|---|---|---|---|---|
| 6,493,466 | B1 * | 12/2002 | Honda et al. | 382/236 |
| 6,608,938 | B2 * | 8/2003 | Honda et al. | 382/236 |
| 7,058,228 | B2 * | 6/2006 | Honda et al. | 382/236 |
| 7,236,649 | B2 * | 6/2007 | Fenney | 382/298 |
| 7,242,811 | B2 * | 7/2007 | Fenney | 382/240 |
| 7,385,611 | B1 * | 6/2008 | Toksvig et al. | 345/582 |
| 7,683,910 | B2 * | 3/2010 | Lu et al. | 345/582 |

* cited by examiner

*Primary Examiner*—Anh Hong Do
(74) *Attorney, Agent, or Firm*—Mirna Abyad; W. James Brady; Frederick J. Telecky, Jr.

(57) ABSTRACT

3D graphics rendering includes texture compression including joint compression of related textures by using one texture to predict the other, object-based compression for non-rectangular textures, and multitexturing with vector quantization.

6 Claims, 10 Drawing Sheets

TEXTURE COMPRESSION

CROSS-REFERENCE TO RELATED APPLICATIONS

Priority is claimed from provisional applications Nos. 60/719,656; 60/719,653; and 60/719,655, all filed Sep. 22, 2005. The following patent applications disclose related subject matter: application Ser. No. 11/459,687, filed Jul. 25, 2006.

BACKGROUND OF THE INVENTION

The present invention relates to computer graphics, and more particularly to texture methods and storage.

Interactive video games use computer graphics to generate images according to game application programs. FIG. 2a illustrates typical stages in computer graphics rendering which displays a two-dimensional image on a screen from an input application program that defines a virtual three-dimensional scene. In particular, the application program stage includes creation of scene objects in terms of primitives (e.g., small triangles that approximate the surface of a desired object together with attributes such as color and texture); the geometry stage includes manipulation of the mathematical descriptions of the primitives; and the rasterizing stage converts the three-dimensional description into a two-dimensional array of pixels for screen display.

FIG. 2b shows typical functions in the geometry stage of FIG. 2a. Model transforms position and orient models (e.g., sets of primitives, such as a mesh of triangles) in model/object space to create a scene (of objects) in world space. A view transform selects a (virtual camera) viewing point and direction for the modeled scene. Model and view transforms typically are affine transformations of the mathematical descriptions of primitives (e.g., vertex coordinates and attributes) and convert world space to eye space. Lighting provides modifications of primitives to include light reflection from prescribed light sources. Projection (e.g., a perspective transform) maps from eye space to clip space for subsequent clipping to a canonical volume (normalized device coordinates). Screen mapping (viewport transform) scales to x-y coordinates for a display screen plus a z coordinate for depth (pseudo-distance) that determines which (portions of) objects are closest to the viewer and will be made visible on the screen. Rasterizing provides primitive polygon interior fill from vertex information; e.g., interpolation for pixel color, texture map, and so forth.

Programmable hardware can provide very rapid geometry stage and rasterizing stage processing; whereas, the application stage usually runs on a host general purposed processor. Geometry stage hardware may have the capacity to process multiple vertices in parallel and assemble primitives for output to the rasterizing stage; and the rasterizing stage hardware may have the capacity to process multiple primitive triangles in parallel. FIG. 2c illustrates a geometry stage with parallel vertex shaders and a rasterizing stage with parallel pixel shaders. Vertex shaders and pixel shaders are essentially small SIMD (single instruction multiple dispatch) processors running simple programs. Vertex shaders provide the transform and lighting for vertices, and pixel shaders provide texture mapping (color) for pixels. FIGS. 2d-2e illustrate pixel shader architecture.

3D games make use of several hundreds of texture images to try to create realistic 3D environments inside 3D games. These texture images, which take up tens to hundreds of megabytes of storage space, are distributed along with the 3D game. The total storage space used by the 3D game is an important consideration in mobile and portable games since media such as flash memory cards used to distribute the game are relatively expensive and have limited capacity. Game size is also an important consideration for network downloadable games on cellphones and other platforms since bandwidth comes at a premium. Texture images take up a significant portion of the total memory used by a game. Hence efficient ways to compress texture images for game distribution becomes important. Compressing texture images also reduces the system memory requirements of 3D games. On system memory limited systems such as cellphones, texture image compression becomes especially important.

Current approaches use lossy compression schemes such as JPEG or DXTC or wavelet coders to individually compress the texture images before distribution. When quality is important, lossy compression is not used. The texture images may get compressed losslessly by the archival program used to package the game release.

In 3D games, texture images are frequently applied on irregular surfaces such as those of humanoid models, weapons, and other irregular objects. The texture images used in these cases have irregular shapes. Because of system constraints (e.g., regularity of texture memory accesses, et cetera), these irregular shapes are stored in rectangular images as illustrated in FIG. 4a.

Texture compression is used in 3D graphics to reduce the enormous amount of bandwidth (which can run into several GB/s) required to transfer texture data to the 3D graphics CPU for use in rendering of 3D graphics scenes. The 3D graphics CPU decompresses the texture image during runtime and uses it for rendering. For reasons of computational efficiency and support for random access of texture image data, simple fixed-length compression schemes are used rather than the bit-efficient and complex variable length schemes such as JPEG. Note that JPEG compression is used for texture compression for game distribution. Before a game is run, the JPEG textures are decompressed and the uncompressed data is used in run-time.

DXTC texture compression is the most popular texture compression scheme used in 3D graphics and is supported on virtually all the modern graphics CPUs. DXTC is a fixed-length compression scheme that provides a 1:4 or 1:6 compression ratio (depending on the precision of the input data). In DXTC image compression, 4×4 blocks of input images are encoded using 64 bits. The data encoded for each 4×4 block consists of two colors c0 and c1 in RGB565 format (taking up 32 bits) and 2-bit indices for each of the 16 pixels in the 4×4 block (taking up 32 bits). In the decoder two intermediate colors are produced by linear interpolation of c0 and c1 to give a total of four color (including c0 and c1). The 2-bit index for each pixel decides which of the four colors to use for coloring the pixel. The DXTC compression scheme can be thought of as a vector quantization (VQ) scheme.

When compared to JPEG, DXTC provides a far inferior performance. However, in practice, when there are enough details in the texture image, the quality degradation is not perceived. Instead, there is a perceived improvement in quality since texture compression enables one to use a texture image that is double the original size and this brings more details into the rendered scene. When the texture images are smoothly varying, the distortion is, however, noticeable. If improved quality is desired on current 3D graphics systems, one would have to use uncompressed texture images which require 24-bits for each color.

U.S. Pat. No. 6,768,493 discloses texture storage with compressed sub-blocks of texels in an image plane.

However, these applications have complexity, memory bandwidth, and compression trade-offs in 3D rendering of video clips.

SUMMARY OF THE INVENTION

The present invention provides various compressions of texture such as joint compression of correlated textures by predicting a second texture from a first texture and compressing the prediction error instead of the second texture, object-based texture compression by a binary map to define the texture object within a rectangular image plus the pixels in the object, and a two-stage vector quantization for texture images by a first stage DXTC-type compression of the texture followed by a second stage compression of the error of the first stage; a vector quantization.

DESCRIPTION OF THE PREFERRED EMBODIMENTS

1. Overview

Preferred embodiment graphics processing and methods provide compressed texture with one or more of the features of joint compression of correlated textures, object-based compression of texture, and 2-stage vector quantization for texture with a first stage compression (e.g., DXTC) and a second stage compression of the first stage quantization error. FIGS. 1a-1g are functional block diagrams illustrating these features.

Figure 3A:
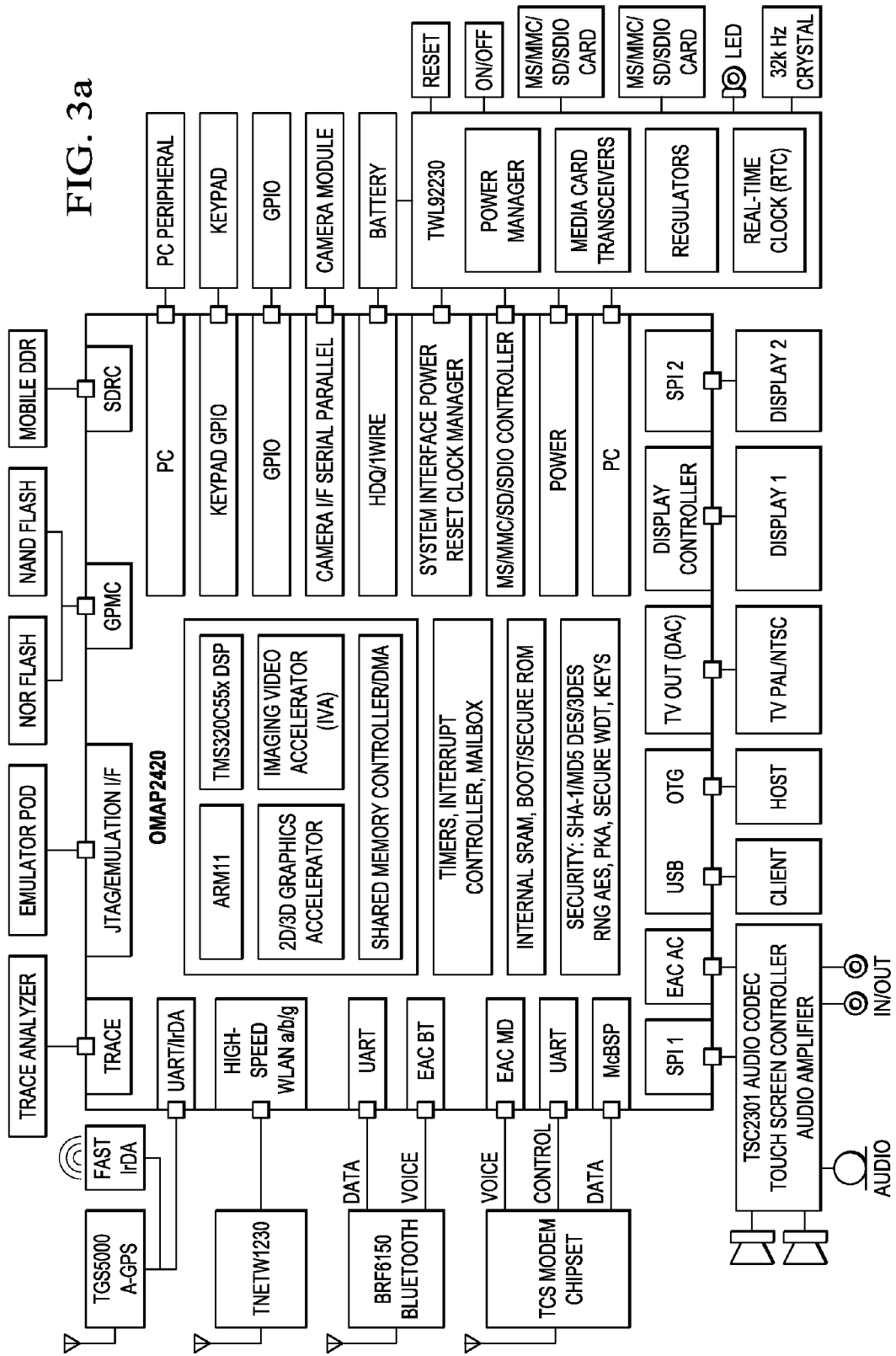
FIGS. 3a-3b show a processor and network.
Figure 3B:
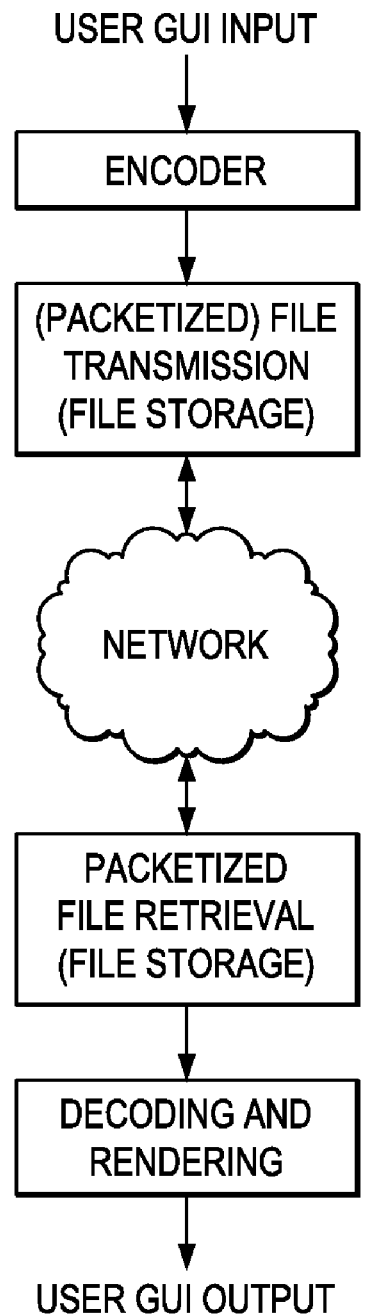

Preferred embodiment systems such as cellphones, PDAs, notebook computers, etc., perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators (e.g., FIG. 3a). A stored program in an onboard or external (flash EEP)ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet as illustrated in FIG. 3b.

2. Correlated Texture Images Preferred Embodiments

Figure 4A:
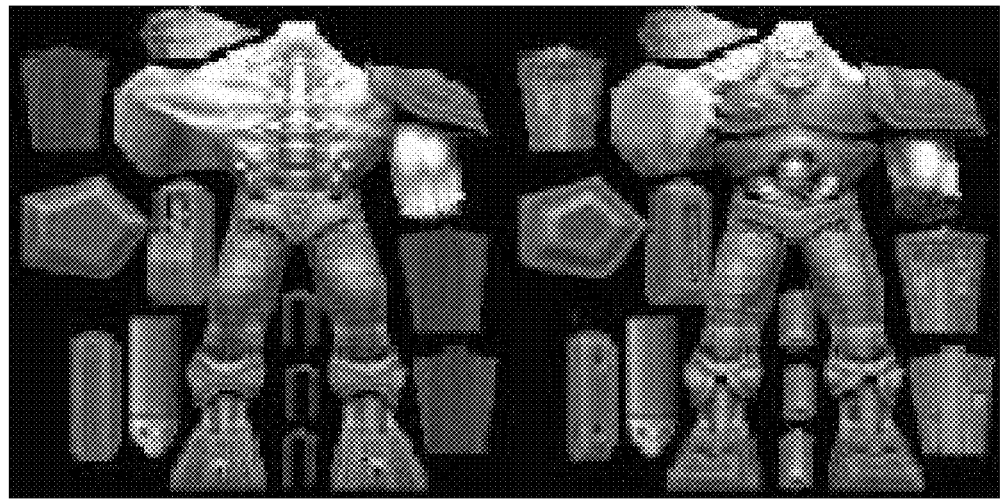
FIGS. 4a-4b illustrate correlated textures.
Figure 4B:
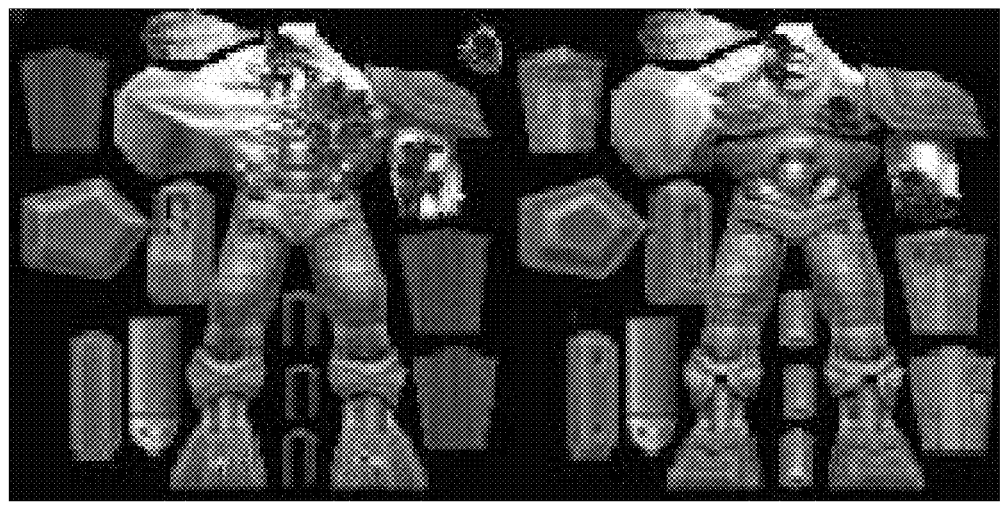

The first preferred embodiments are based upon the observation that there may be a significant correlation between two texture images used to skin models inside 3D games. These texture images are usually the largest texture files in a game and contain many details. FIGS. 4a-4b show two texture images used to skin a model; the image in FIG. 4a is used on the model when it is in a healthy state in the game, and the image in FIG. 4b is used on the model when it has suffered injury during the course of the game. We can see from the figures that the texture images are very similar except for extra blood splashes in the texture image in FIG. 4b. Therefore jointly compressing the two images provides better compression than compressing the images independently. The first preferred embodiments provide simple methods for joint compression of such texture images, both lossy joint compression and lossless joint encoding. This provides improved compression performance when compared to independent compression.

Figure 1A:
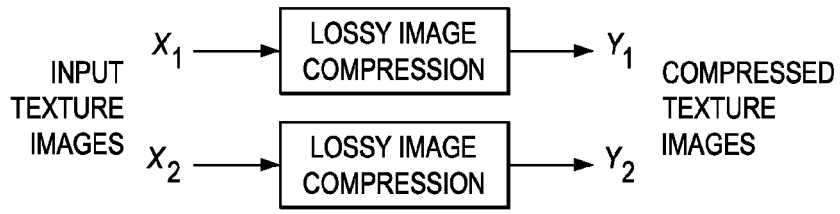
FIGS. 1a-1g illustrate texture compressions.
Figure 1B:
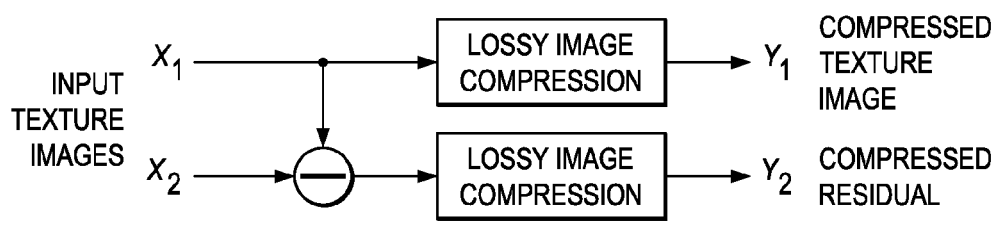

FIG. 1a shows the traditional approach of compressing texture images in a lossy fashion. Texture images $X_1$ and $X_2$ are compressed independently to produce compressed bitstreams $Y_1$ and $Y_2$. At the decoder $Y_1$ and $Y_2$ are decompressed to obtain $\hat{X}_1$ and $\hat{X}_2$ which are approximations of $X_1$ and $X_2$. In contrast, FIG. 1b shows a preferred embodiment jointly compressing texture images $X_1$ and $X_2$. Texture image $X_1$ is first compressed to obtain compressed bitstream $Y_1$. Then, texture image $X_1$ is subtracted (pixel-by-pixel) from $X_2$ and the difference image is compressed to obtain the compressed residual $Y_2$. In effect, $X_1$ is used as a predictor for $X_2$. At the decoder, first decompress $Y_1$ to obtain $\hat{X}_1$. Then decompress $Y_2$ and add to $\hat{X}_1$ to get $\hat{X}_2$.

More generally, the preferred embodiment method of FIG. 1b can be extended to three or more correlated texture images. For example, if images $X_1$, $X_2$, and $X_3$ are correlated (e.g., $X_1$ and $X_2$ as in FIGS. 4a-4b and $X_3$ is a further or different injury), then $X_1$ again could be a predictor for $X_2$, and $X_2$ could be a predictor for $X_3$. In this case, image $X_1$ is first compressed to obtain compressed bitstream $Y_1$. Next, image $X_1$ is subtracted (pixel-by-pixel) from $X_2$ and the difference between the two is compressed to obtain the compressed residual $Y_2$. Then, image $X_2$ is subtracted from $X_3$ and the difference between the two is compressed to obtain the second compressed residual $Y_3$. At the decoder, first decompress $Y_1$ to obtain $\hat{X}_1$. Next, decompress $Y_2$ and add to $\hat{X}_1$ to get $\hat{X}_2$. Lastly, decompress $Y_3$ and add to $\hat{X}_2$ to get $\hat{X}_3$.

Note that the prediction relation is essentially symmetric: $X_2$ predicts $X_1$ as well as $X_1$ predicts $X_2$. But with three correlated texture images other possibilities exist: $X_1$ could be the best predictor for both $X_2$ and $X_3$, then compress $X_1$, $X_2-X_1$, and $X_3-X_1$. Further, if one of $X_1$, $X_2$, and $X_3$ is expected to be the used much more frequently than the other two, and decompression multiple times is expected due to memory space limitations, then pick the more frequently used image as the predictor for the other correlated images to limit decompressions.

Figure 1C:
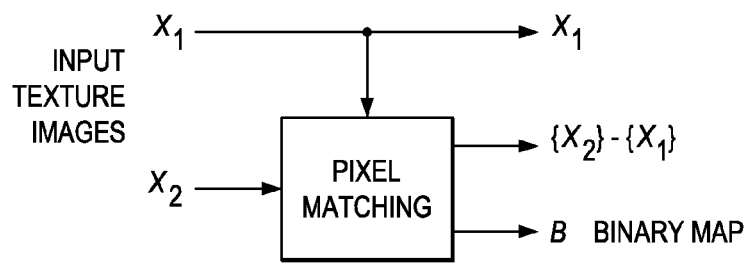

FIG. 1c shows a first preferred embodiment encoder for joint encoding of texture images in lossless mode; it makes use of pixel matching. The encoder takes in texture images $X_1$ and $X_2$ and outputs a binary map B and the set $\{X_2\}-\{X_1\}$. The binary map B is of the same dimensions as the input images $X_1$ and $X_2$. A "1" in the binary map indicates that there was a pixel match at the co-located pixels in $X_1$ and $X_2$, and a "0" in the binary map indicates that there was no match. The set $\{X_2\}-\{X_1\}$ contains pixels of $X_2$ that do not match those of $X_1$. Given $X_1$, by using the binary map B and the set $\{X_2\}-\{X_1\}$, we can easily reconstruct $X_2$ as follows: where the binary map contains a "1", the co-located pixel from image $X_1$ is used as the pixel value for $X_2$. And where the binary map contains a "0", a pixel is read from $\{X_2\}-\{X_1\}$ and is used as the pixel for $X_2$. Pixels from $\{X_2\}-\{X_1\}$ are read in a sequential fashion whenever a "0" is encountered in B. That is, the pixels of $\{X_2\}-\{X_1\}$, are stored in raster scan order of "0"s in B.

As before, three or more texture images, $X_1$, $X_2$, and $X_3$, may be correlated and the FIG. 1c preferred embodiment extended to output two binary maps, $B_{12}$ and $B_{23}$, and corresponding differences sets $\{X_2\}-\{X_1\}$ and $\{X_3\}-\{X_2\}$. Alternatively, the two binary maps may be $B_{12}$ and $B_{13}$, and the corresponding differences sets $\{X_2\}-\{X_1\}$ and $\{X_3\}-\{X_1\}$.

3. Object-Based Texture Image Preferred Embodiments

Figure 1D:
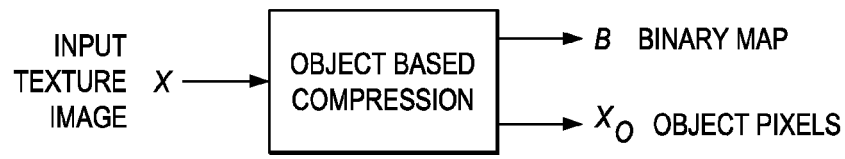
Figure 1E:

FIGS. 1d-1e illustrate second preferred embodiment object-based texture compression which is useful in applications such as downloadable avatars on cellphones and downloadable 3D games because they can reduce the bandwidth requirements for the downloads. They are also useful in reducing the game size for game distribution. Object-based texture compression also reduces the system memory requirements. It also reduces the system memory bandwidth required to transfer the texture from system memory to texture memory in 3D graphics hardware. On system-memory-limited systems, such as cellphones and portable gaming devices, object-based texture compression can prove to be an useful technique.

The second preferred embodiments include two lossless techniques for object-based compression of uncompressed texture images and DXTC compressed texture images. Both of these types of texture images are used in practice. DXTC is a very popular lossy texture compression scheme used in 3D graphics hardware. When quality is important, lossy compression is not adopted and the texture image is kept uncompressed. (Note that the uncompressed texture image may eventually get losslessly compressed when archiving it for distribution.)

FIG. 1d shows the second preferred embodiment method encoding the input texture image X by the set of object pixels $X_O$ and a binary map B. The binary map is of the same size of the input texture image. A "1" in the binary map indicates that the corresponding pixel is inside the texture object and the pixel is stored in $X_O$. A "0" in the binary map indicates that the pixel is not inside the texture objects and is discarded. By using $X_O$ and B, we can easily recover the rectangular image X where a pixel not inside the texture object is set to a default value. Note that texture images are typically taken to be rectangular for ease of coordinate transformation computations.

And as with the FIG. 1c, if texture objects $X_{O1}$ and $X_{O2}$ in texture images $X_1$ and $X_2$ are correlated, then $X_{O1}$ and $B_1$ easily regenerate a rectangular image $X_1$; and the difference set $\{X_{O2}\}-\{X_{O1}\}$ with its corresponding binary map $B_{12}$ can be combined with $X_{O1}$ plus $B_1$ to generate a rectangular image $X_2$. Note that pixels in $X_{O1}$ but not in $X_{O2}$ are located in the binary map $B_{12}$ and have the default value.

FIG. 1e shows the second preferred embodiment method with an input DXTC-compressed image. In DXTC image compression, 4×4 blocks of an input image are encoded with 64 bits: 32 bits for the local palette (two 16-bit colors in 5-bit red, 6-bit green, 5-bit blue format) and 32 bits (16 2-bit values) for indices into the palette; each 2-bit value determines one of four colors: the two in the palette and two interpolations. We extend FIG. 1d by adopting object-based coding of the 4×4 blocks. FIG. 1e shows the method: the input texture image $X_D$ is encoded by the set of object pixels blocks $X_{DO}$ and a binary map B. The binary map is of the size (imwidth/4)×(imheight/4) where (imwidth, imheight) are the (width, height) of the input texture image, respectively. A "1" in the binary map indicates that the corresponding 4×4 pixel block is inside the texture object and the pixel block is stored in $X_{DO}$. A "0" in the binary map indicates that the pixel block is not inside the texture object and is discarded. By using $X_{DO}$ and B, we can easily recover the rectangular image $X_D$ where the pixel blocks not inside the texture objects are set to a default value.

Again, with correlated texture objects one DXTC-compressed object could be the predictor for the other DXTC-compressed object and allow encoding of one object and the prediction error (residual) of the other object. That is, with $X_{D1}$ and $X_{D2}$ as DXTC-compressed versions of correlated texture object images $X_1$ and $X_2$, first define $X_{D1O}$ and $B_1$ as in the preceding paragraph for the texture object of $X_1$; next, define $B_{12}$ as a binary map of the 4×4 pixel blocks where the objects differ (this is the same as where $X_{DO2}$ differs from $X_{DO1}$), and then define $Y_{DO2}$ as the equal to $X_{O2}$ for 4×4 pixel blocks indicated by $B_{12}$ as $X_{DO2}$ differing from $X_{DO1}$. Thus $Y_{DO2}$ may be much smaller than $X_{DO2}$ for highly correlated objects.

4. Two-Stage VQ Preferred Embodiment

The third preferred embodiment methods include a 2-stage vector quantization (VQ) approach based on DXTC that provides improved quality when compared to the current DXTC coding scheme. The first stage consists of the traditional DXTC coding scheme. In the second stage, we take the error image resulting from the first stage and encode it with a gain-shape VQ scheme based on DXTC. The output of the second stage when added to the first stage leads to a refined or more accurate representation of the input. Note that this improvement in quality comes at the expense of increased bit-rate to store the quantized error image; but this increase is still less than the 24-bit pixels required for uncompressed texture image.

The method can be efficiently implemented on existing 3D graphics hardware by using multitexturing or multipass texture rendering. Multitexturing/multipass rendering is a widely used technique in 3D game engines, and up to ten stages/passes are used for rendering a scene. Each of these passes or stages introduces additional reality (such as bump mapping, volumetric/atmospheric effects, lighting, et cetera) into the scene. We use two stages/passes of multitexturing or multipass rendering to render and add the outputs of our two-stage VQ scheme. During the first stage/pass, we render the original DXTC compressed texture image. During the second stage/pass, we render the DXTC compressed error image. The method introduces one additional stage/pass for improved quality and the relative increase in complexity is not too significant.

Figure 1F:
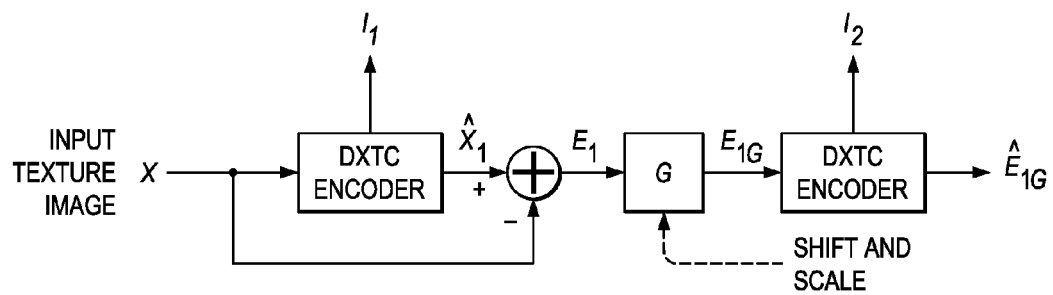
Figure 1G:
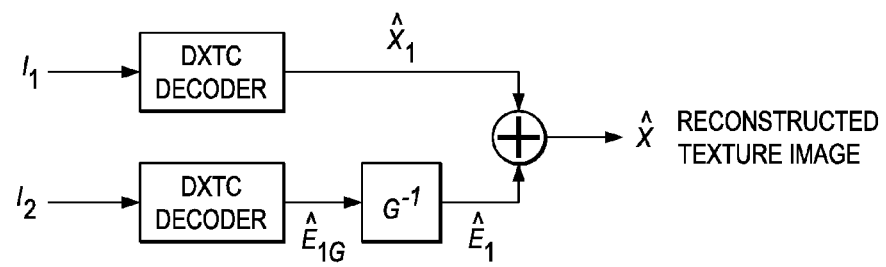
Figure 2A:
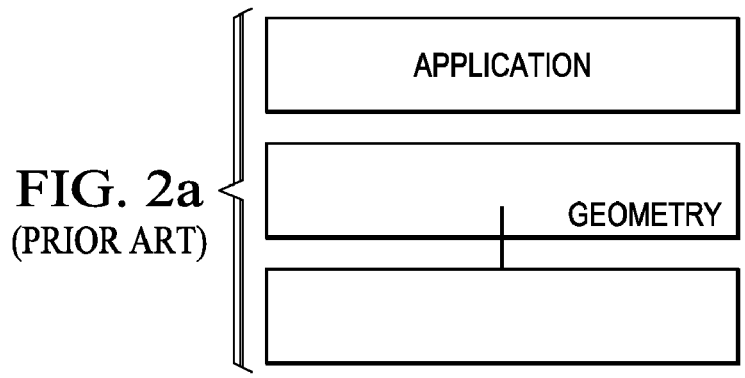
FIGS. 2a-2e are functional block diagrams for computer graphics.
Figure 2B:
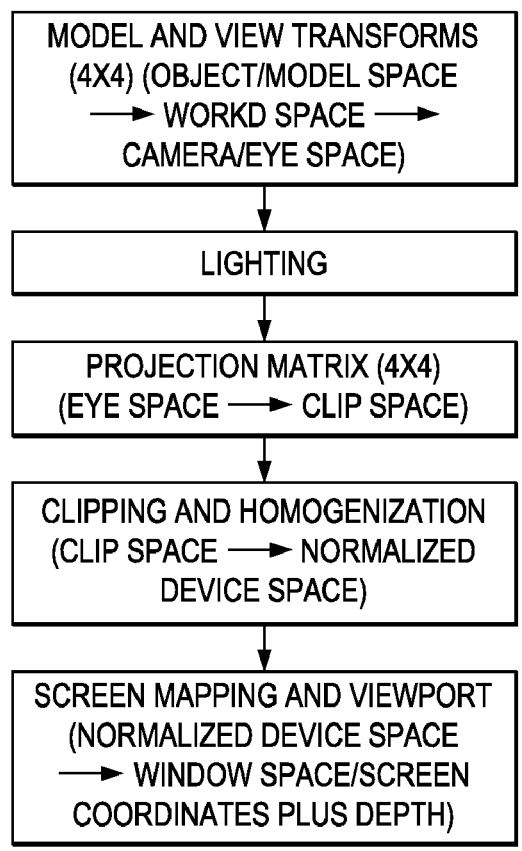
Figure 2C:
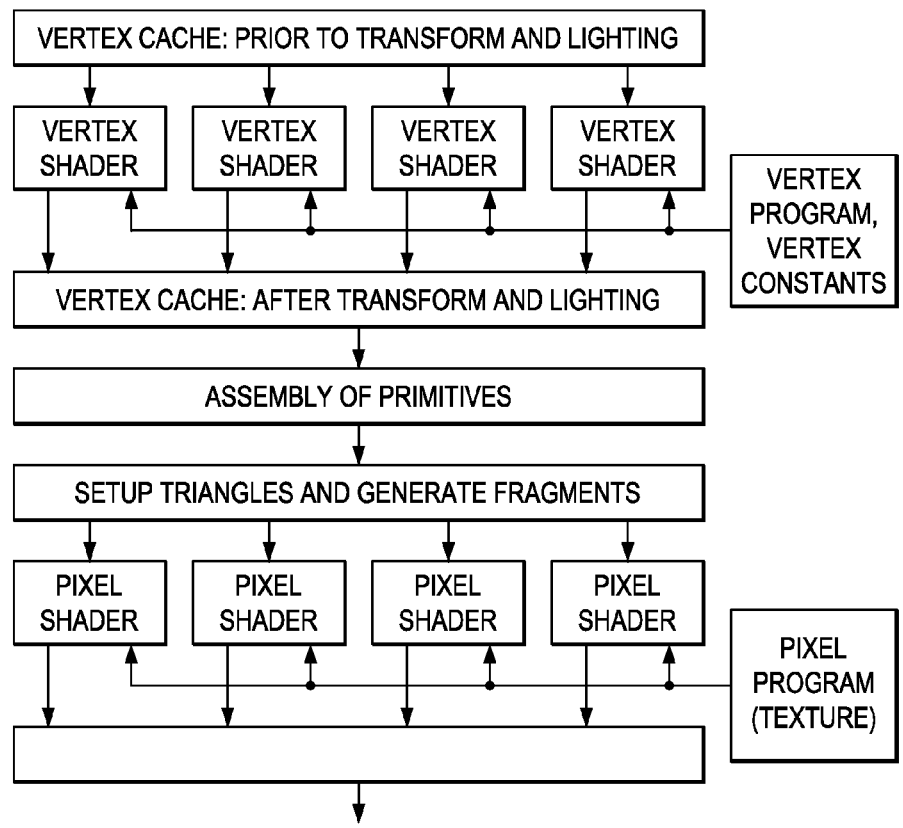
Figure 2D:
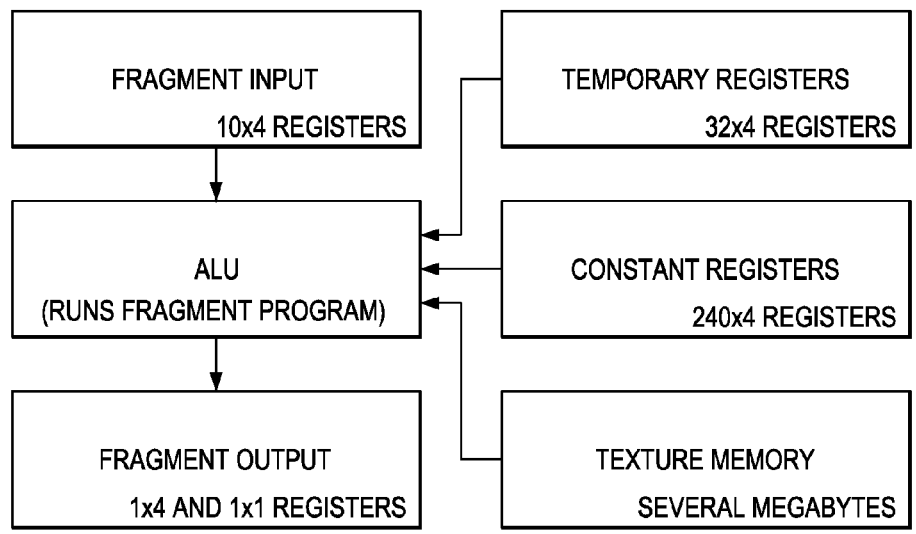
Figure 2E:
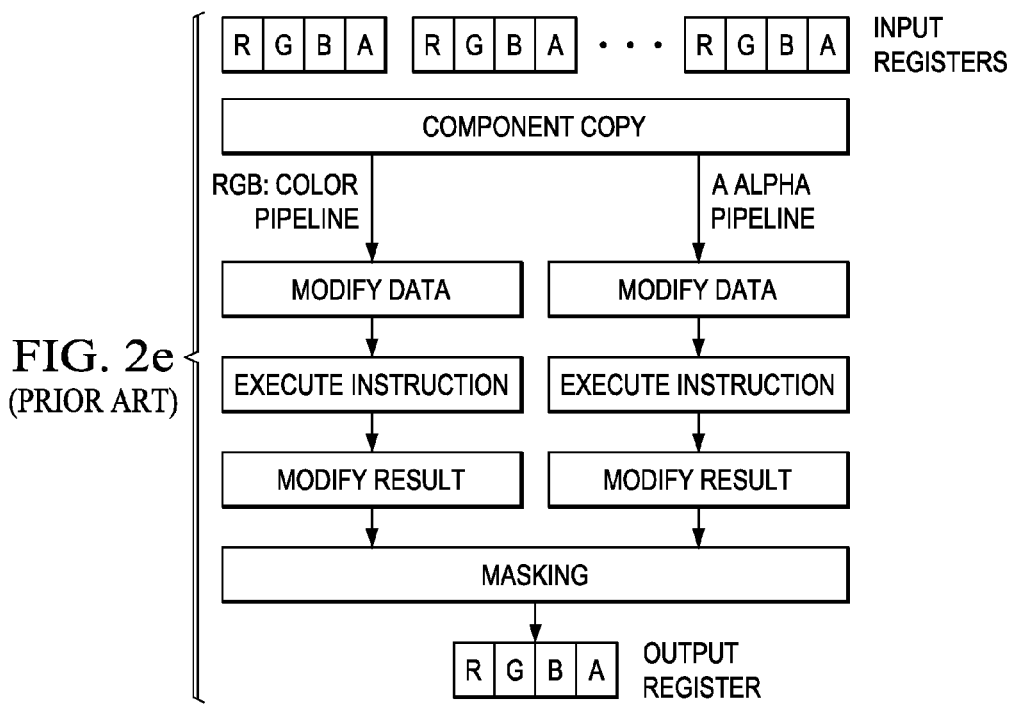

FIGS. 1f-1g show the encoder and decoder of the third preferred embodiment two-stage VQ scheme for texture compression. In the encoder the input image X is compressed by the DXTC encoder to obtain the quantized output $\hat{X}_1$ and the compressed bitstream $I_1$. We then calculate (pixel-by-pixel) the error image $E_1$ and input it to the shift and scale unit G which performs the following input-output operation on all the pixels of $E_1$:

$$\text{output}=256*(\text{input}+\text{threshold})/(2*\text{threshold})$$

The error image $E_1$ has both negative and positive values. The DXTC encoder however assumes the input pixels to be non-negative and in the range 0-255 for each of the primary colors (24-bit color). Block G basically shifts and scales the error image so that it is in the valid range. Block G also clamps the values to lie within the range 0-255. For example, when threshold value threshold=16, the block G transforms the input range of [−16, 16] to [0, 255]. Note when $\hat{X}_1$ is a good approximation of X, then the pixel values in $E_1$ will generally be small and likely of random sign. For input $E_1$, the output of block G, $E_{1G}$, is input to the second DXTC encoder. The compressed bitstream that comes out of the second DXTC encoder is called $I_2$. Note that $I_1$ takes up to 4 bits per pixel, and $I_2$ also takes up to 4 bits per pixel; whereas, the original image was 24 bits per pixel. In the decoder we reverse the process to obtain the reconstructed texture image. FIG. 1g shows the block diagram of the decoder.

The threshold value threshold we used was a factor of 2 to simplify multiplication in the decoder. To calculate the value of threshold, we iterate over the possible value of threshold such that the mean squared error between X and $\hat{X}$ is minimized. Note that the encoder complexity has increased, but it is the decoder complexity that is important during run-time.

The third preferred embodiments could be extended to include another DXTC encoding using a shift and scaling of the overall reconstruction error. In particular, first DXTC-compress an input texture image Y to get output $I_1$ which decompresses to the first reconstruction $\hat{Y}_1$, and defines the first error, $E_1 = Y - \hat{Y}_1$. Next, apply shifting and scaling function G() to the first error to get the shifted and scaled first error $E_{1G} = G(E_1)$. Next, DXTC-compress $E_{1G}$ to get output $I_2$ which decompresses to $\hat{E}_{1G}$. Now the second reconstruction is $\hat{Y}_2 = \hat{Y}_1 + G^{-1}(\hat{E}_{1G})$, and this defines the second error $E_2 = Y - \hat{Y}_2$. Then apply shifting and scaling function G to the second error to get the shifted and scaled second error $E_{2G} = G(E_2)$. Again, DXTC-compress $E_{2G}$ to get output $I_3$ which decompresses to $\hat{E}_{2G}$. Lastly, the third reconstruction using $I_1$, $I_2$, and $I_3$ is $\hat{Y}_3 = \hat{Y}_2 + G^{-1}(\hat{E}_{2G}) = \hat{Y}_1 + G^{-1}(\hat{E}_{1G}) + G^{-1}(\hat{E}_{2G})$. Because each DXTC compression may have its own color palette, the three different DXTC compressions provides much more accurate reconstruction.

5. Experimental Results for Joint Compression of Correlated Images

For the first preferred embodiments (predictors used with correlated images) a H.264 video coder was used to evaluate the lossy joint image encoder. Table 1 shows the compressed bitstream sizes when H.264 is used to encode 18 different texture images from Quake2. The quantization parameter QP used is 18. The PSNR for the compressed images is in the range of about 44-45 dB. In Table 1, each image has been compressed independently, i.e., by using I-frames only encoding. Table 2 shows the results when texture images in a row are jointly compressed with the preferred embodiment method. Joint compression is achieved by running the H.264 codec in IPIP mode, i.e., the second image is predictively encoded with respect to the first image.

TABLE 1

Independent compression of texture images using H.264.

| Texture name | Size in bits |
|---|---|
| tex01402 | 100360 |
| tex01411 | 107952 |
| tex01420 | 99608 |
| tex01429 | 109864 |
| tex01438 | 91592 |
| tex01447 | 101384 |
| tex01481 | 107920 |
| tex01490 | 112048 |
| tex01499 | 98280 |
| tex01508 | 103488 |
| tex01557 | 114872 |
| tex01566 | 118328 |
| tex01648 | 124552 |
| tex01657 | 128200 |
| tex01666 | 110600 |
| tex01675 | 117464 |
| tex01694 | 103344 |
| tex01711 | 102768 |

TABLE 2

Joint compression of texture images using H.264.

| Texture name | Size in bits |
|---|---|
| tex01402 | 100360 |
| tex01411 | 47008 |
| tex01420 | 99608 |
| tex01429 | 39160 |
| tex01438 | 91592 |
| tex01447 | 35904 |
| tex01481 | 107920 |
| tex01490 | 20144 |
| tex01499 | 98280 |
| tex01508 | 20272 |
| tex01557 | 114872 |
| tex01566 | 22000 |
| tex01648 | 124552 |
| tex01657 | 33408 |
| tex01666 | 110600 |
| tex01675 | 41688 |
| tex01694 | 103344 |
| tex01711 | 60328 |

The total number of bits used to encode all the 18 texture images when each is independently compressed is 1952624 bits. The total number of bits used to encode the 18 texture images when they are jointly compressed is 1271040 bits. So the first preferred embodiment method achieves a bit savings of 34.90%.

For the first preferred embodiments with a lossless encoding, use the same set of 18 texture images as used for the lossy encoding to demonstrate the additional compression achieved by using the joint lossless encoder. Table 3 shows the sizes of the 18 texture images. Table 4 shows the results when the texture images in a row are jointly encoded using the lossless scheme. This achieves an average bit savings of 37.98%.

TABLE 3

Raw texture image sizes.

| Texture name | Size in bits |
|---|---|
| tex01402 | 786432 |
| tex01411 | 786432 |
| tex01420 | 786432 |
| tex01429 | 786432 |
| tex01438 | 786432 |
| tex01447 | 786432 |
| tex01481 | 786432 |
| tex01490 | 786432 |
| tex01499 | 786432 |
| tex01508 | 786432 |
| tex01557 | 786432 |
| tex01566 | 786432 |
| tex01648 | 786432 |
| tex01657 | 786432 |
| tex01666 | 786432 |
| tex01675 | 786432 |
| tex01694 | 786432 |
| tex01711 | 786432 |

TABLE 4

Joint lossless encoding of texture images.

| Texture name | Size in bits |
|---|---|
| tex01402 | 786432 |
| tex01411 | 181472 |
| tex01420 | 786432 |

TABLE 4-continued

Joint lossless encoding of texture images.

| Texture name | Size in bits |
|---|---|
| tex01429 | 196784 |
| tex01438 | 786432 |
| tex01447 | 160040 |
| tex01481 | 786432 |
| tex01490 | 120896 |
| tex01499 | 786432 |
| tex01508 | 177920 |
| tex01557 | 786432 |
| tex01566 | 167168 |
| tex01648 | 786432 |
| tex01657 | 115928 |
| tex01666 | 786432 |
| tex01675 | 159896 |
| tex01694 | 786432 |
| tex01711 | 421160 |

6. Experimental Results for Object-Based Preferred Embodiments

The texture images from the 60-second demo of Quake2 were used to demonstrate the performance of the object-based preferred embodiments. The 60-second demo of Quake2 makes use of 258 texture images, out of which 52 texture images are suitable for object based coding. These texture images are typically the largest textures and comprise 40% of the total texture data. The results apply only for this set of texture images which consist of textures for skin, for fonts, and for special effects. The remaining textures are rectangular textures and are used for texturing surfaces such as walls and boxes. Table 5 summarizes the results of using the object-based compression. An average bit savings of 16.98% for DXTC compressed images and 18.55% for uncompressed texture images was achieved.

TABLE 5

Bit savings by using object based compression.

| Texture image type | Original size in bits (non-object based coding) | Compressed size in bits (using object based compression) | Average bit savings |
|---|---|---|---|
| Uncompressed | 26443776 | 21437152 | 18.55% |
| DXTC compressed | 4407296 | 3659136 | 16.98% |

7. Experimental Results for Two-Stage Preferred Embodiments

Figure 5A:
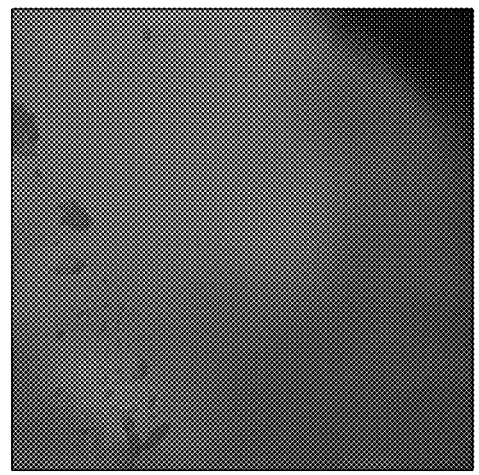
FIGS. 5a-5c illustrate a texture and two compression-decompression results.
Figure 5B:
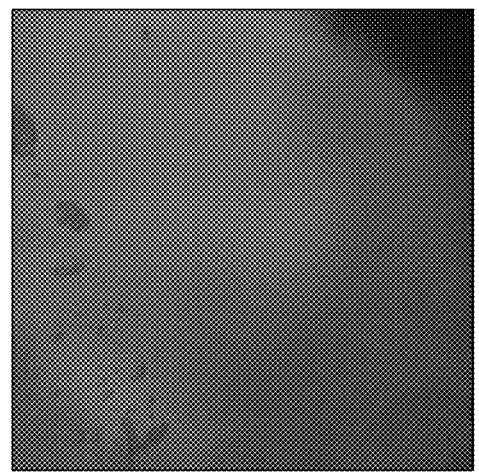
Figure 5C:
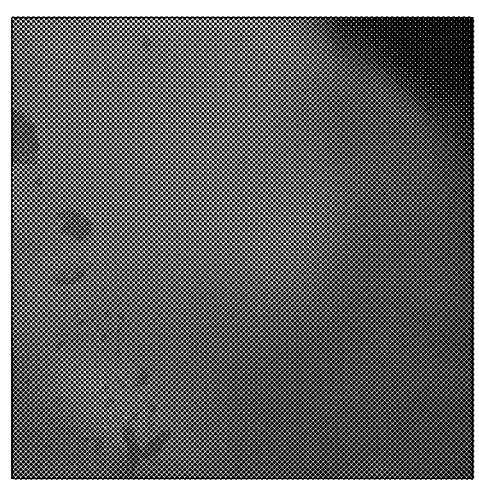
Figure 6A:
FIGS. 6a-6c illustrate another texture and two compression-decompression results.
Figure 6B:
Figure 6C:

FIGS. 5a-5c are a comparison of DXTC and the preferred embodiment 2-stage VQ scheme on a Quake2 texture image of a skyline. FIG. 5a is the original, FIG. 5b the DXTC compressed version after decompression, and FIG. 5c the 2-stage compressed version after decompression. From FIG. 5c we can see the improved reconstruction from using the 2-stage VQ. FIGS. 6a-6c show the same comparisons for another Quake2 texture image of a skyline. From FIG. 6c we can see the improved reconstruction by using 2-stage VQ, especially in the region of the yellow streak in the sky. Table 6 lists the PSNR values for both of these images. There is an improvement in the PSNR values too, as expected. Note that the DXTC coding scheme used 4-bits per pixel and the 2-stage VQ used 8-bits per pixel.

TABLE 6

PSNR comparison for DXTC and 2-stage VQ

| | DXTC PSNR for R, G, B components | 2-stage VQ PSNR for R, G, B components |
|---|---|---|
| FIG. 5 | 38.41(R), 39.01(G), 43.24(B) | 46.53(R), 40.95(G), 53.43(B) |
| FIG. 6 | 35.73(R), 33.09(G), 36.82(B) | 40.09(R), 34.30(G), 42.81(B) |

8. Modifications

The preferred embodiments may be modified in various ways while retaining one or more of the features of predictive compression of correlated images, object-based compression, and two-stage compression.

As example, games such as Unreal Tournament support multi-team options, and so textures for three teams—normal team, red team, and blue team—are required. Texture images in such cases have a lot of redundant information and they can be jointly compressed using the correlated image preferred embodiment methods.

H.264 was used for joint lossy coding. Other video codecs and techniques such as 3D-SPIHT wavelet coding can also be used. In the case of 3D-SPIHT, the wavelet used for the first decomposition would be the Haar wavelet. And the output of the joint lossless encoder can be entropy coded to achieve further compression. The binary map B has a lot of spatial correlation that can be exploited by entropy coding.

For object-based compression, the preferred embodiments can be extended when texture compression is done by using lossy schemes such as JPEG or wavelet coding. In these cases, we can adopt region-of-interest based coding to do object based coding. Again, the binary map that is output by the object-based coder can be entropy coded to achieve further bit savings The 2-stage VQ compression can also be applied to other texture compression scheme less popular than DXTC, such as the FXTC compression scheme and the PowerVR texture compression scheme.

What is claimed is:

1. A method in a processor of texture compression, comprising the steps of:
    (a) providing first and second texture images;
    (b) finding a third image as the difference between said first and second images;
    (c) jointly compressing in said processor said first image and said third image; and
    (d) finding an error image as the difference between said image and a decompression of a DXTC-compressed image.

2. The method of claim 1, wherein said compressing is lossy.

3. A method of a processor for texture image compression, comprising the steps of:
    (a) providing a texture image which includes a texture object of less than all the pixels of said image;
    (b) finding a bit map which indicates pixels within said object and pixel outside of said object;
    (c) compressing, in said processor, said texture image as said bit map plus said object; and
    (d) finding an error image as the difference between said image and a decompression of a DXTC-compressed image.

4. A method in a processor of DXTC-compressed texture image compression, comprising the steps of:

(a) providing a DXTC-compressed texture image which includes a texture object of less than all the pixels of said image;
(b) finding a binary map which indicates DXTC 4×4 pixel blocks containing pixels within said object; and
(c) jointly compressing, in said processor, said DXTC-compressed texture image as said binary map and a portion of said DXTC-compressed texture image corresponding to said DXTC 4×4 pixel blocks of said object.

5. A method of a processor of texture image compression, comprising the steps of:

(a) providing a texture image;
(b) jointly DXTC-compressing said image in said processor;
(c) finding an error image as the difference between said image and a decompression of said DXTC-compressed image; and
(d) DXTC-compressing said error image.

6. The method of claim 5 wherein after said finding an error image, shifting and scaling said error image prior to said DXTC-compressing.

* * * * *